United States Patent
Warner

(10) Patent No.: US 8,795,519 B2
(45) Date of Patent: Aug. 5, 2014

(54) ELECTROMAGNETIC BOOM AND ENVIRONMENTAL CLEANUP APPLICATION FOR USE IN CONJUNCTION WITH MAGNETIZABLE OIL

(75) Inventor: Arden Ayube Warner, Oswego, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 418 days.

(21) Appl. No.: 13/112,251

(22) Filed: May 20, 2011

(65) Prior Publication Data

US 2011/0309026 A1 Dec. 22, 2011

(51) Int. Cl.
 *B01D 35/06* (2006.01)
 *C02F 1/48* (2006.01)
 *E02B 15/04* (2006.01)

(52) U.S. Cl.
 USPC ........................ 210/170.05; 210/222; 210/243

(58) Field of Classification Search
 USPC .............. 210/170.05, 222, 242, 3, 695, 242.3
 See application file for complete search history.

(56) References Cited

U.S. PATENT DOCUMENTS

| 3,635,819 | A | | 1/1972 | Kaiser |
| 3,717,573 | A | | 2/1973 | Warren |
| 4,497,708 | A | * | 2/1985 | Young .......................... 210/222 |
| 4,576,569 | A | * | 3/1986 | Koblanski ..................... 210/222 |
| 5,149,226 | A | | 9/1992 | Antinoro et al. |
| 7,303,679 | B2 | | 12/2007 | Ulicny et al. |
| 2004/0108276 | A1 | | 6/2004 | Christodoulou |

* cited by examiner

*Primary Examiner* — David A Reifsnyder
(74) *Attorney, Agent, or Firm* — Kevin Soules; Luis M. Ortiz; Kermit D. Lopez

(57) ABSTRACT

A method and system for efficient oil spill cleanup are disclosed. Inserting magnetic filings in the oil magnetizes the spilled oil. An electromagnetic boom associated with an oil spill cleanup apparatus are used to create a magnetic field proximate to the electromagnetic boom. The magnetic field draws the magnetized oil toward the boom. The magnetic field is periodically switched on and off to create a pumping effect and draws the magnetized oil to a collection apparatus. The electromagnetic boom is directed through the effected environment using a thruster on the distal end of the boom.

10 Claims, 5 Drawing Sheets

ELECTROMAGNETIC BOOM AND ENVIRONMENTAL CLEANUP APPLICATION FOR USE IN CONJUNCTION WITH MAGNETIZABLE OIL

CROSS-REFERENCE TO PROVISIONAL APPLICATION

This patent application claims the benefit under 35 U.S.C. §119(e) of U.S. Provisional Patent Application Ser. No. 61/368,123, which was filed on Jul. 27, 2010 and is entitled "Electromagnetic Boom and Environmental Cleanup Application for Use in Conjunction with Magnetizable Oil". U.S. Provisional Patent Application Ser. No. 61/368,123 is incorporated herein by reference in its entirety. This patent Application also claims the benefit under 35 U.S.C. §119(e) of U.S. Provisional Patent Application 61/356,319, which was filed on Jun. 18, 2010 and is entitled "Methods and Systems for Remediating Environments Contaminated by Oil". U.S. Provisional Patent Application 61/356,319 is also incorporated herein by reference in its entirety.

TECHNICAL FIELD

Embodiments are generally related to the field of oil spill dean up. Embodiments are also related to methods and systems for cleaning oil from water, surfaces, and wildlife. Embodiments are additionally related to the use of an electromagnetic boom for cleaning magnetizable oil from surfaces and water.

BACKGROUND OF THE INVENTION

Human release of oil into the environment is an ongoing environmental concern. An oil spill is generally understood as an evacuation of liquid petroleum hydrocarbon into the environment due to human activity. This may be from oil tankers, offshore platforms, drilling rigs, wells, or a number of other sources. Public attention is often drawn to marine oil spills, where oil is released into the ocean or coastal waters.

Oil spills are known to cause numerous environmental problems. Seabirds and marine mammals that are exposed to oil spills may suffer from a number of conditions. Oil reduces the insulating capacity of plumage and fur, and the ingestion of oil can cause various internal complications. Oil also affects marine flora because it reduces the penetrating depth of sunlight thus retarding the process of photosynthesis for underwater plants.

A number of approaches are presently used to cleanup oil spills. The techniques used depend on many factors including the type of oil spilled, the temperature of the water, and the affected environment. Known cleanup methods include the use of microorganisms or biological agents to breakdown or remove oil, controlled burning, the use of dispersants and dredging, skimming, and vacuum and centrifuge techniques where oil is sucked up with water and then separated from the water with a centrifuge.

Current methods and systems are not adequate to quickly cleanup oil spills, and thereby minimize the environmental impact of those spills. Current boom apparatuses are passive meaning they are only used to passively contain an oil spill but fail to actively aid in cleaning the oil. It is therefore necessary to develop an active boom method and system for cleaning oil spills.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a simple and environmentally safe method to cleanup, recover, and manipulate oil.

It is another aspect of the disclosed embodiments to provide for a method and system for magnetic or electromagnetic cleanup of oil.

It is yet another aspect of the disclosed embodiments to provide for an enhanced method and system for an electromagnetic boom for cleanup of oil spills.

The aforementioned aspects and other objectives and advantages can now be achieved as described herein. A method and system for oil spill clean up. An electromagnetic boom apparatus can comprise solenoids and buoys alternately linked on a tether. A thruster can be connected to the distal end of the tether for sweeping the tether through an environment. A collection apparatus can be formed at the origin of the tether so that the solenoids can produce a driving magnetic field that pumps spilled oil to the collection apparatus. The solenoids can each include pole pieces on each respective end of the solenoids. The apparatus can also include a power source connected to the origin of the tether so that the tether provides power to the thruster and solenoids thereby creating an electromagnetic field. Mixing iron filings with the spilled oil can magnetize the spilled oil.

In an alternative embodiment, the electromagnetic boom apparatus can further include a magnetic box fitted over the source of spilled oil wherein a pipe can be fitted to the magnetic box so that the magnetized spilled oil is pumped into the magnetic box creating a magnetic gasket to control the flow of oil from the source.

In an embodiment, a method can be provided for collecting spilled oil. Such a method can comprise magnetizing oil associated with an oil spill, deploying an electromagnetic boom in the oil spill, inducing a magnetic field around the electromagnetic boom, and driving the magnetized oil along the induced magnetic field to a collection point, thereby removing the magnetized oil associated with the oil spill from an environment. In another embodiment of such a method, operations can be implemented for thrusting a distal end of the electromagnetic boom with a thruster, and sweeping the electromagnetic boom through the oil spill. In yet another embodiment of such a method, operations can be provided for configuring the electromagnetic boom with a plurality of alternating links of floats and solenoids connected by a power carrying tether to a collection apparatus, and capping the plurality of solenoids with a pole piece on each end of the solenoid.

In still another embodiment, operations for magnetizing the oil associated with an oil spill can further comprise an operation for inserting a plurality of iron filings in the oil associated with the oil spill. In another embodiment, operations can be provided for pumping the magnetized oil into a magnetic box formed to cover a source of the oil spill, inducing a magnetic field in the magnetic box, and creating a magnetic gasket within the magnetic box to control a flow of the oil spill. In an additional embodiment, the operation for driving the magnetized oil can further comprise an operation for activating the plurality of solenoids periodically to create a pumping effect on the magnetized oil. Additional embodiments may include, for example, deploying the electromagnetic boom from a dock, or deploying the electromagnetic boom from a boat. The aforementioned environment generally comprises an aquatic environment.

In another embodiment, an electromagnetic boom apparatus can comprise a plurality of solenoids and a plurality of buoys alternately linked on a tether, a thruster connected to a distal end of the tether for sweeping the tether through an environment, and a collection apparatus formed at the origin of the tether wherein the solenoids produce a driving magnetic field that pumps a spilled oil to the collection apparatus. In another embodiment of such an apparatus, a plurality of pole pieces can be formed on the each end of the plurality of solenoids. In yet another embodiment of such apparatus, a power source can be connected to the origin of the tether wherein the tether provides power to the thruster and the tether provides power to the solenoids thereby creating an electromagnetic field. Additionally, in another embodiment, mixing a plurality of iron filings with the spilled oil can magnetize the spilled oil.

In another embodiment, the aforementioned electromagnetic boom apparatus can further comprise a magnetic box fitted over a source of the spilled oil and a pipe fitted to the magnetic box wherein the magnetized spilled oil is pumped into the magnetic box thereby creating a magnetic gasket to control a flow of the spilled oil.

In another embodiment, a system can be provided for collecting spilled oil. Such a system may include a plurality of solenoids and a plurality of buoys alternately linked on a tether, and a thruster connected to a distal end of the tether for sweeping the tether through an environment. Such a system embodiment can further include a plurality of iron filings mixed with the spilled oil thereby rendering the spilled oil magnetic. Such a system embodiment can further include a collection apparatus formed at an origin of the tether wherein at least one solenoid among the plurality of solenoids produced a driving magnetic field that pumps the magnetized spilled oil to the collection apparatus.

In yet another embodiment, such a system can be configured to include a magnetic box fitted over a source of the spilled oil and a pipe fitted to the magnetic box wherein the magnetized spilled oil is pumped into the magnetic box to create a magnetic gasket within the magnetized box for controlling a flow of the spilled oil. Additionally, in another embodiment, a plurality of pole pieces can be formed on each end of the plurality of solenoids. In still another embodiment of such a system, a power source can be connected to the origin of the tether wherein the tether provides power to the thruster and the tether provides power to the solenoids thereby creating an electromagnetic field. In another embodiment, the plurality of solenoids can be activated periodically to create a pumping effect on the magnetized spilled oil.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate one or more embodiments, including preferred and alternative embodiments, and are not intended to limit the scope thereof.

Figure 1:
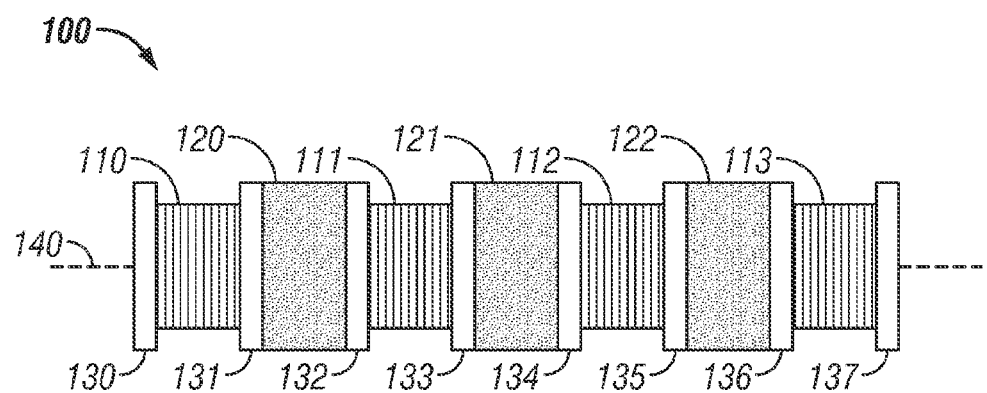
FIG. 1 illustrates a side view of a section of an electromagnetic boom in accordance with the disclosed embodiments.

FIG. 1 depicts a section of an exemplary electromagnetic boom apparatus 100, in accordance with the disclosed embodiments. It should be appreciated that FIG. 1 is only exemplary and is not intended to assert or imply any limitation with regard to the environments in which aspects or embodiments may be implemented. Many modifications to the depicted environments may be made without departing from the spirit and scope of the disclosed embodiments.

Electromagnetic boom apparatus 100 can be configured to include a series of floatation buoys 120-122 arranged between a series of solenoids 110-113. The solenoids are capped on each end by pole pieces 130-137. For example, solenoid 110 is capped by pole piece 130 on one side and pole piece 131 on the other side. Electromagnetic boom apparatus 100 can be bound together by a tether 140. A tether 140 may also be used to supply power to the solenoids 110-113.

A solenoid, for example, solenoids 110-113, can be a loop of wire wrapped around a magnetic core. When an electric current is passed through the wire, a magnetic field is produced. Such a current can be provided from a power source via a tether 140. Thus, by passing a current through solenoids 110-113, each solenoid is an electromagnet. Because a user can control the current provided to the solenoids 110-113, the strength and direction of the magnetic field produced can also be controlled. While solenoids 110-113 are preferably configured as described above, any electromagnet may be used in an alternative embodiment.

When an electric current is provided to solenoids 110-113, a longitudinal magnetic field is produced. This magnetic field attracts magnetized oil to the electromagnetic boom apparatus 100 and pumps the magnetized oil toward one end of the electromagnetic boom 100. In a preferred embodiment, solenoids 110-113 can be subject to a current periodically, thereby switching the magnetic field on and off. Such an arrangement can serve to prevent the accumulation of material on the poles of the electromagnet and thereby prevent shorts. The solenoids can be wired in three groups, which can be sequenced to create a traveling field. Switching the magnetic field on and off according to this sequencing fosters the pumping of magnetized oil to a collection point.

Electromagnetic boom apparatus 100 can be utilized in some embodiments as a temporary floating barrier used to contain and clean an oil spill. While boom 100 can be utilized in a marine environment, the apparatus 100 may alternatively be implemented for oil spill containment and clean up in a non-marine environment such as on land or on a water free surface. Electromagnetic boom apparatus 100 may also be used to divert oil-contaminated water to a collection point or to change the course of the contamination. Alternatively, electromagnetic boom apparatus may be used to block an environmentally sensitive area from contamination. One skilled in the art will appreciate that in many cases the use of a single boom may not be effective in containing and cleaning a contaminated environment. Thus, in an alternative embodiment, a number of electromagnetic booms 100 may be used simultaneously to effectively contain and clean oil from an environment.

Figure 2:
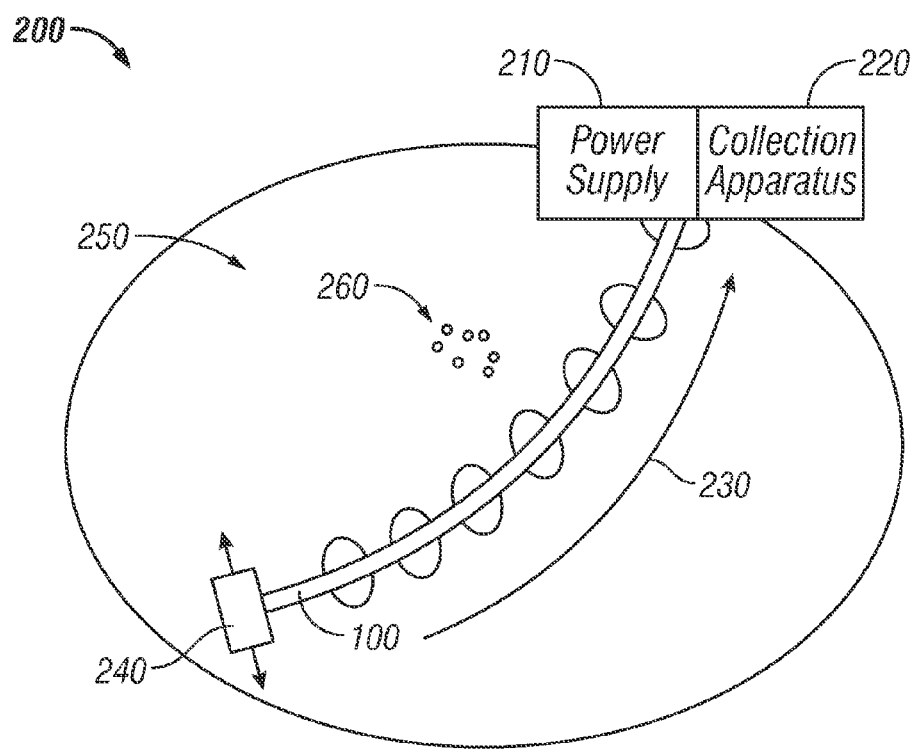
FIG. 2 illustrates a diagram of an oil spill clean up apparatus in accordance with the disclosed embodiments.

FIG. 2 illustrates a diagram of an oil spill cleanup apparatus 200 in accordance with the disclosed embodiments. FIG. 2 shows an electromagnetic boom apparatus 100 connected to a power supply 210 and a collection apparatus 220. A power supply 210 is used to provide power to the solenoids associated with electromagnetic boom apparatus 100 as shown in FIG. 1.

A collection apparatus 220 is located at one end of the electromagnetic boom apparatus 100. In a preferred embodiment, a collection apparatus 220 may be a vacuum type device that sucks the oil driven to the collection device via the electromagnetic boom apparatus 100. However, one skilled in the art will appreciate that any number of collection devices are known in the art anyone of which may be implemented as a collection apparatus 200.

In FIG. 2, the distal end of the electromagnetic boom apparatus 100 is fitted with a thruster 240. A thruster 240 is used to sweep the electromagnetic boom apparatus 100 through an environment 250. A thruster 240 may be provided power via a tether 140 (shown in FIG. 1) or alternatively maybe self powered. A thruster 240 may also be controlled by a user. A user may use a thruster 240 to direct the electromagnetic boom apparatus 100 to a certain location or sweep the electromagnetic boom apparatus 100 through an environment 250 as shown.

In a preferred embodiment, the oil associated with the oil spill is rendered magnetic by adding iron filings, ferrite dust filings, or magnetite 260 to the viscous oil. The filings 260 are allowed to mix with the oil and form a colloidal suspension that floats on water. The filings 260 are generally between 0.1 µm-10 µm in size. A skilled artisan will appreciate any known material and/or method may be used to magnetize spilled oil. In an alternative embodiment, a magnetic mixture may be pumped directly into the source of an oil spill. The resultant oil that is produced is either magnetized or readily magnetizable.

Once the oil has been magnetized, it will be responsive to the magnetic field created proximate to the electromagnetic boom apparatus 100. Arrow 230 illustrates the travel path of magnetized oil toward a collection apparatus 220 once it is subjected to the magnetic field proximate to the electronic boom apparatus 100. Oil spill cleanup apparatus 200 is thus used to pump magnetized oil to a collection apparatus 220.

In an alternative embodiment, ferrite filings 260 may be coated with an environmentally safe oil absorbent material. Many such materials and methods for coating are known in the art. In this embodiment, a collection apparatus 220 would be configured to create a magnetic field used to vacuum the magnetized oil from the environment 250.

The environment 250 may be embodied by any surface affected by oil. One such example of the environment 250 may, for example, be a terrestrial environment, a marine environment, or another water free surface environment. Oil spill cleanup apparatus 200 may be deployed into the environment 250 from a dock, a ship, or any other location proximate to the environment 250 as necessary.

The environment 250 may also be a living creature. For example, the environment 250 may be a bird covered in oil. In such an example, a bird covered in viscous oil can be saturated with iron filings 260. A scaled version of the electromagnetic boom apparatus 100 including solenoids 110-113 can then be used to remove the oil from the bird. In such a case, solenoids 110-113 may preferably be replaced by a suitable scaled electromagnet.

Figure 3A:
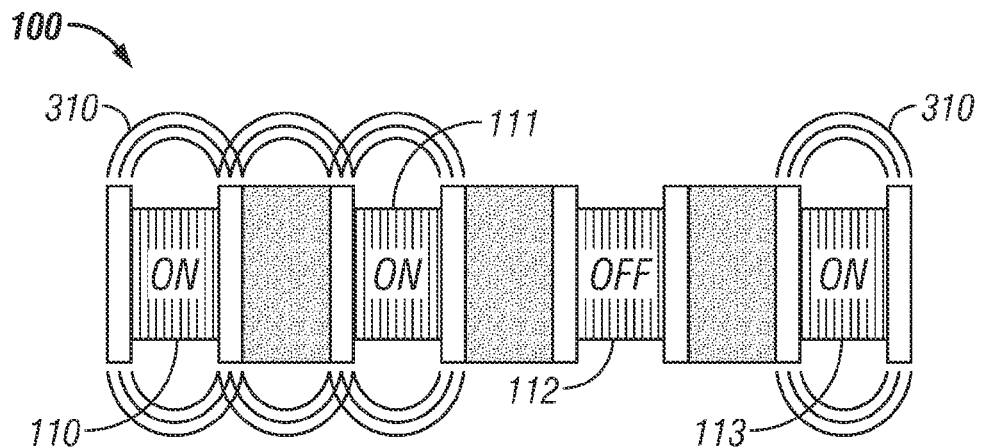
FIGS. 3(a)-3(c) illustrate an electromagnetic boom propagating an electromagnetic field in accordance with the disclosed embodiments.
Figure 3B:
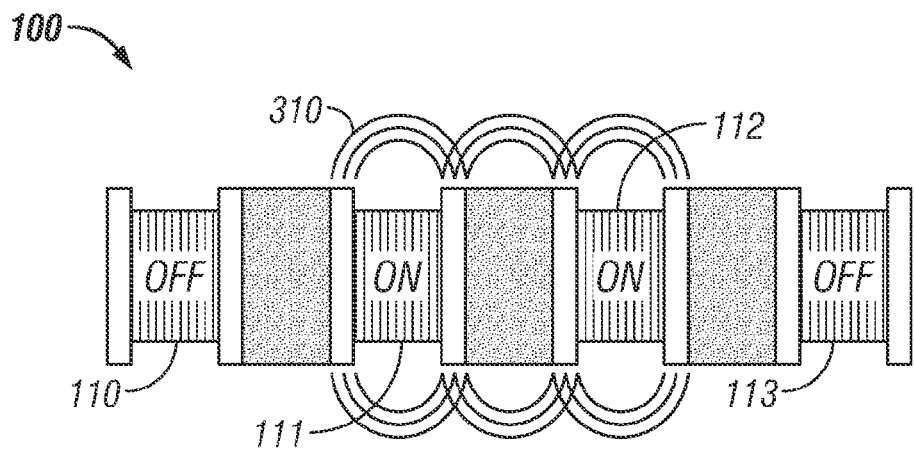

FIGS. 3(a)-3(b) illustrate a pumping sequence of an electromagnetic boom apparatus 100, in accordance with the disclosed embodiments. FIG. 3(a) generally depicts four solenoids 110-113, as illustrated in FIG. 1. In FIG. 3(a), solenoids 110 and 111 are illustrated as "on". This means a current is being provided to the solenoids thus creating a magnetic field 310. Solenoid 112 is labeled "off" and no magnetic field is therefore propagated. Solenoid 113 is "on" and magnetic field 310 is therefore shown.

FIG. 3(b) illustrates the electromagnetic boom 100 a short period after the FIG. 3(a). Note that in the exemplary illustration depicted in FIG. 3(b), solenoids 110 and 113 are "off" while solenoids 111 and 112 are "on". Thus, a magnetic field 310 is generally present and proximate to solenoids 111 and 112. An electromagnetic field 310 has propagated along the electromagnetic boom apparatus 100.

Figure 3C:
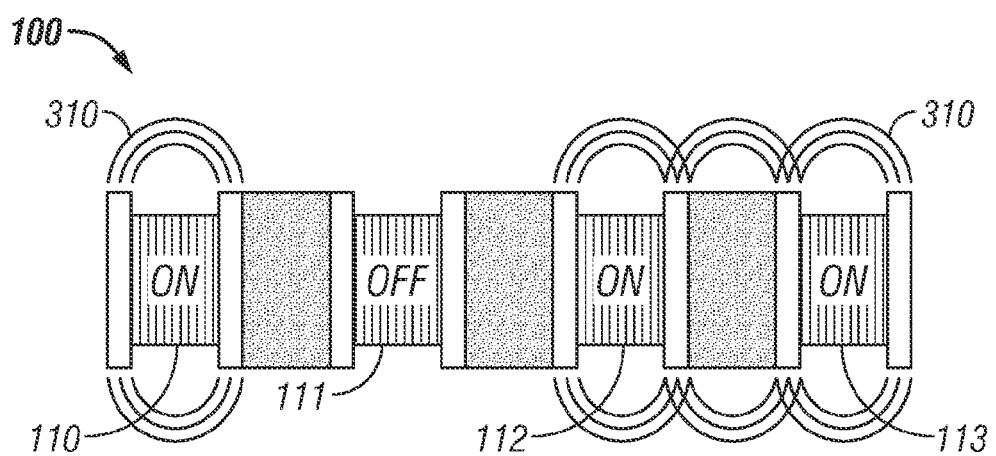

In FIG. 3(c), solenoid 111 has been switched "off", while solenoids 110, 112, and 113 are now "on". Again FIG. 3(c) represents a short period after FIG. 3(b). FIG. 3(c) shows how magnetic field 310 has again propagated along the electromagnetic boom apparatus 100.

In combination, FIGS. 3(a)-(c) illustrate that in a preferred embodiment, solenoids 110-113 are periodically switched on and off. This serves to create the pumping action of magnetic field 310 shown by arrow 230 in FIG. 2. Periodically switching solenoids 110-113 also serves to prevent shorting due to material build-up at the poles of the solenoids. Such a shorting may be caused, for example, by iron filings 260 if solenoids 110-113 were not switched on and off. The pumping action is used to actively direct magnetized oil to a collection apparatus such as collection apparatus 220.

The solenoids 110-113 represented in FIGS. 3(a)-(c) are exemplary of a section of solenoids associated with an electromagnetic boom 100. The length and design considerations of electromagnetic boom 100 are both used to determine the total number of solenoids included in the apparatus. The solenoids 110-113 may also be wired in groups of three via tether 140 and other necessary wiring equipment as necessary. This wiring arrangement is sequenced as shown in FIGS. 3(a)-(c) to provide a traveling magnetic field as described above, and to collect and pump ferromagnetic infused fluids to a collection point.

Figure 4:
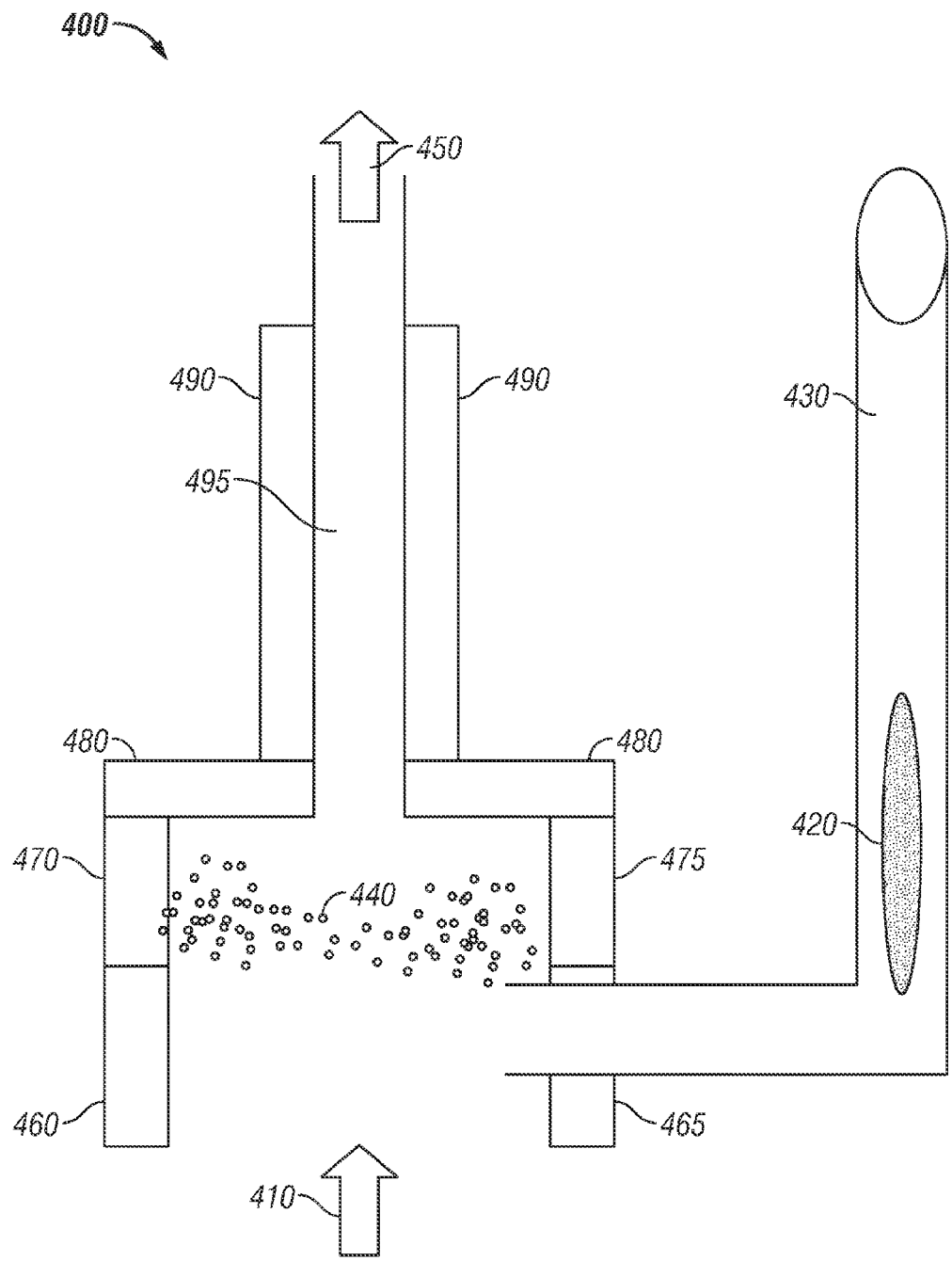
FIG. 4 illustrates a side view of a magnetic box apparatus in accordance with the disclosed embodiments.

FIG. 4 illustrates a side view of a magnetic box 400 apparatus in accordance with the disclosed embodiments. Thus, in accordance with another aspect of the disclosed embodiments, an oil leak can be addressed at its source utilizing the magnetic box 400 illustrated in FIG. 4. Magnetic box 400 can be placed in a position around a leaking substance such as leaking oil indicated by arrow 410. A colloidal magnetic material 420 can be pumped from a point outside the affected environment into magnetic box 400 using pipe 430. The colloidal material 420 will form a magnetic gasket inside the box 400 as the magnetic filings 440 separate from the oil and cling to the box walls 470 and 475. The oil will continue to flow through the magnetic gasket toward the surface as indicated by arrow 450. However, the rate of flow will be significantly decreased as the oil naturally works through the gasket, thereby allowing for improved control of the flow as the leak is fixed.

Note the colloidal mixture 420 pumped into the magnetic box 400 can be the same oil collected from the surface of the environment using electromagnetic boom apparatus 100.

Magnetic box 400 includes four outer walls. Because of the perspective of FIG. 4, only two of the four walls are shown. The lower section of the outer walls 460 and 465 can be made of a non-magnetic material. In a preferred embodiment, the lower section of the outer walls 460 and 465 are made of lead. The upper section of the outer walls 470 and 475 are formed from a magnetic material so that a magnetic field is induced between the walls. The top of magnetic box 480 can be fitted with a removable choke magnet 490. Choke magnet 490 can be used to provide increased flow control if necessary. Finally, a relief pipe 495 is provided out of the top of box 400 to allow a controlled oil flow to a collection point at the surface of the environment.

Figure 5:
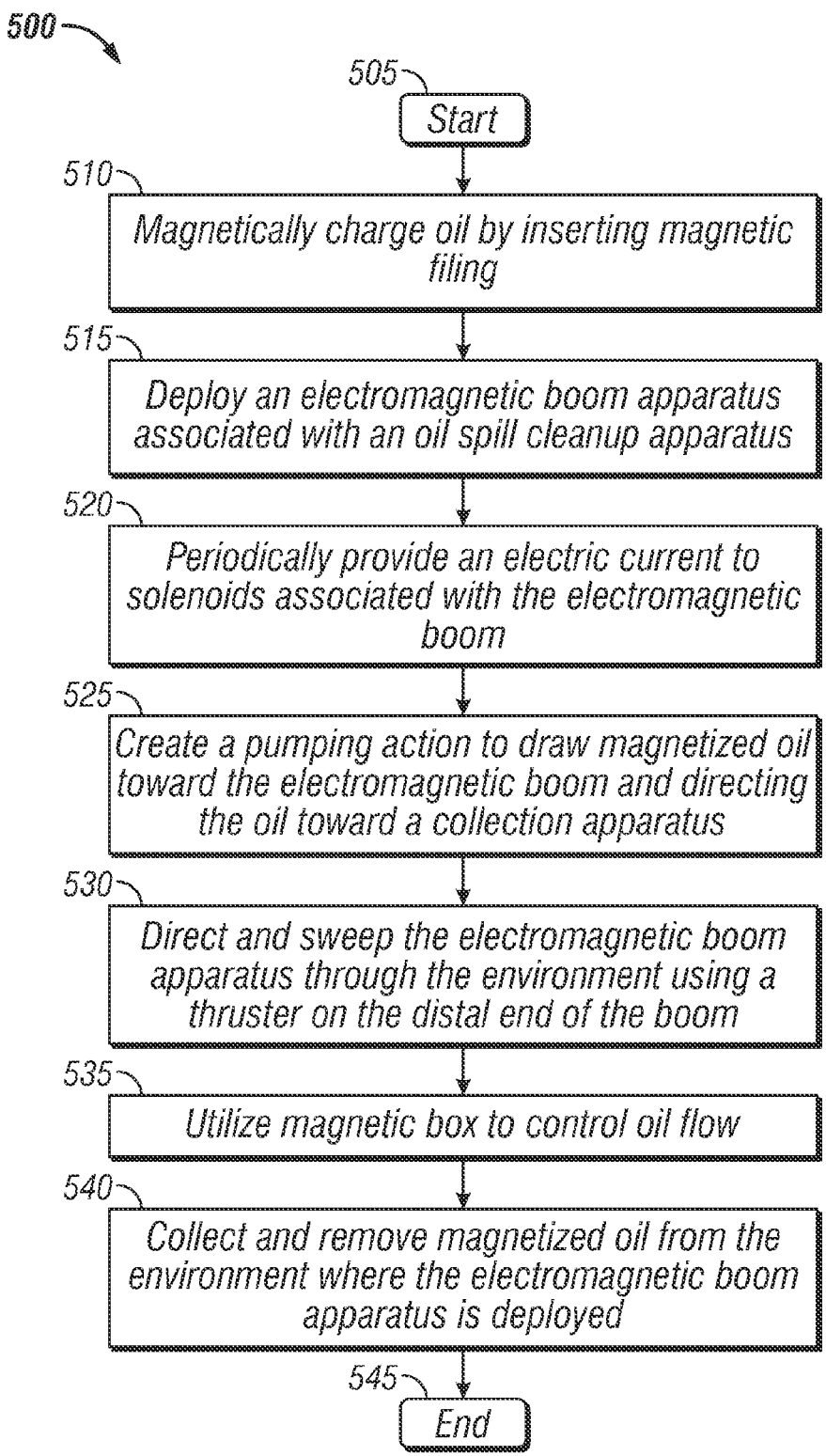
FIG. 5 illustrates a high-level flow chart of operations depicting logical operational steps of a method for efficient oil clean up in accordance with the disclosed embodiments.

FIG. 5 illustrates a high-level flow chart of operations depicting logical operational steps of a method 500 for efficient oil clean up using an oil spill cleanup apparatus such as oil spill cleanup apparatus 200 and magnetic box 400, in accordance with the disclosed embodiments. As indicated at block 505, the method 500 can begin. Next, as indicated at block 510, oil associated with an oil spill in an environment can be magnetized. This can be achieved by inserting iron filings or magnetite in the spilled oil. Alternatively, a magnetic mixture can be pumped into the source of the oil, for example, a leaking oil well so that the produced oil is magnetized. Additionally, a step or operation of magnetizing the oil can be performed by coating the iron filings in an environmentally safe, oil absorbent material and then dispersing it in the oil.

As illustrated next at block 515, an oil spill cleanup apparatus including an electromagnetic boom apparatus, such as electromagnetic boom apparatus 100, is deployed into an environment. Next, as shown at block 520, an electric current is provided to the solenoids, for example, solenoids 110-113, thereby creating a plurality of electromagnets.

The periodic current provided to the solenoids 110-113 creates a pumping action as described at block 525. The periodic magnetic field draws the magnetized oil to the electromagnetic boom apparatus 100 and directs, or pumps, it toward a collection apparatus located at the end of the electromagnetic boom apparatus 100.

A thruster located on the distal end of the electromagnetic boom apparatus, for example, thruster 240, is then used to sweep the boom through the environment. A user may direct the boom to a specific location or sweep the boom across the entire environment as illustrated at block 530. In addition, a magnetic box apparatus 400 can be used to control oil flow as indicated at block 535. These steps allows for the active containment and cleaning of the entire affected environment.

Finally, as depicted at block 540, the magnetized oil can be removed from the environment utilizing a collection apparatus such as, for example, the collection apparatus 220. The collection may be a vacuum type device as described above. The method then ends at block 545. Method 500 thus provides an active and efficient way to remove oil from an affected environment.

Figure 6:
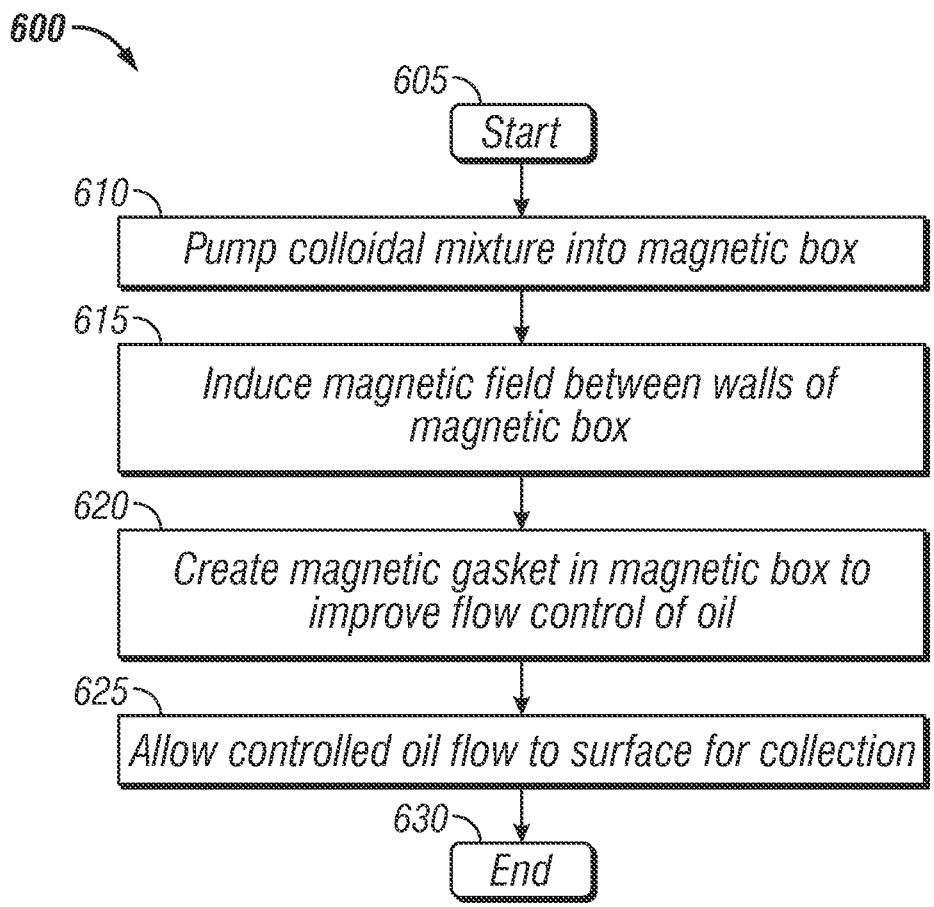
FIG. 6 illustrates a high-level flow chart of operations depicting logical operational steps of a method for controlling oil flow in accordance with the disclosed embodiments.

FIG. 6 illustrates a high level operational flow chart of operations of a method 600 associated with step 535 from FIG. 5, in accordance with the disclosed embodiments. As indicated at block 605, operations of method 600 can be initiated. Thereafter, as indicated at block 610, a colloidal mixture of oil and magnetic filings can be pumped from the surface of an environment into a magnetic box such as, for example, magnetic box 400.

The magnetic box 400 can be constructed to include a lower section and upper section. The lower section of the magnetic box 400 is not magnetized. The upper section of the magnetic box 400 can be formed from a magnetic material so that a magnetic field is induced within the magnetic box 400, as described at block 615. As the magnetic filings separate from the oil because they are subject to the magnetic field, a magnetic gasket can be formed within the box 400, as indicated at block 620.

Oil will continue to flow naturally through the magnetic box 400. However, as described at block 625, as a result of the magnetic gasket and the effects of gravity, the flow rate will be reduced allowing for a controlled flow to the environment surface where the oil can be collected. The method 600 depicted in FIG. 6 can then terminate, as depicted at block 630.

In summation, the disclosed embodiments for an oil spill cleanup can include, for example, an electromagnetic boom apparatus that comprises solenoids and buoys alternately linked on a tether. A thruster can be connected to the distal end of the tether for sweeping the tether through an environment, and a collection apparatus can be formed at the origin of the tether so that the solenoids can produce a driving magnetic field that pumps spilled oil to the collection apparatus. The solenoids can each include pole pieces on each respective end of the solenoids. The apparatus can also include a power source connected to the origin of the tether so that the tether provides power to the thruster and solenoids thereby creating an electromagnetic field. The spilled oil can be magnetized by mixing iron filings with the spilled oil.

In an alternative embodiment, the electromagnetic boom apparatus further includes a magnetic box fitted over the source of spilled oil wherein a pipe can be fitted to the magnetic box so that the magnetized spilled oil is pumped into the magnetic box creating a magnetic gasket to control the flow of oil from the source.

Thus, in an embodiment, a method can be provided for collecting spilled oil. Such a method can comprise magnetizing oil associated with an oil spill, deploying an electromagnetic boom in the oil spill, inducing a magnetic field around the electromagnetic boom, and driving the magnetized oil along the induced magnetic field to a collection point, thereby removing the magnetized oil associated with the oil spill from an environment. In another embodiment of such a method, operations can be implemented for thrusting a distal end of the electromagnetic boom with a thruster and sweeping the electromagnetic boom through the oil spill. In yet another embodiment of such a method, operations can be provided for configuring the electromagnetic boom with a plurality of alternating links of floats and solenoids connected by a power carrying a tether to a collection apparatus, and capping the plurality of solenoids with a pole piece on each end of the solenoid.

In still another embodiment, operations for magnetizing the oil associated with an oil spill can further comprise an operation for inserting a plurality of iron filings in the oil associated with the oil spill. In another embodiment, operations can be provided for pumping the magnetized oil into a magnetic box formed to cover a source of the oil spill, inducing a magnetic field in the magnetic box, and creating a magnetic gasket within the magnetic box to control the flow of the oil spill. In an additional embodiment, the operation for driving the magnetized oil can further comprise an operation for activating the plurality of solenoids periodically to create a pumping effect on the magnetized oil. Additional embodiments may include, for example, deploying the electromagnetic boom from a dock, or deploying the electromagnetic boom from a boat. The aforementioned environment generally comprises an aquatic environment.

In another embodiment, an electromagnetic boom apparatus can comprise a plurality of solenoids and a plurality of buoys alternately linked on a tether, a thruster connected to a distal end of the tether for sweeping the tether through an environment, and a collection apparatus formed at the origin of the tether wherein the solenoids produce a driving magnetic field that pumps spilled oil to the collection apparatus. In another embodiment of such an apparatus, a plurality of pole pieces can be formed on each end of the plurality of solenoids. In yet another embodiment of such apparatus, a power source can be connected to the origin of the tether wherein the tether provides power to the thruster and the tether provides power to the solenoids thereby creating an electromagnetic field. Additionally, in another embodiment, the spilled oil can be magnetized by mixing a plurality of iron filings with the spilled oil.

In another embodiment, the aforementioned electromagnetic boom apparatus can further comprise a magnetic box fitted over a source of the spilled oil, and a pipe fitted to the magnetic box wherein the magnetized spilled oil is pumped into the magnetic box thereby creating a magnetic gasket to control the flow of the spilled oil.

In another embodiment, a system can be provided for collecting spilled oil. Such a system may include a plurality of solenoids and a plurality of buoys alternately linked on a tether, and a thruster connected to a distal end of the tether for sweeping the tether through an environment. Such a system embodiment can further include a plurality of iron filings mixed with spilled oil thereby rendering the spilled oil magnetic. Such a system embodiment can further include a collection apparatus formed at an origin of the tether wherein at least one solenoid among the plurality of solenoids produce a driving magnetic field that pumps the magnetized spilled oil to the collection apparatus.

In yet another embodiment, such a system can be configured to include a magnetic box fitted over a source of the spilled oil, and a pipe fitted to the magnetic box wherein the magnetized spilled oil is pumped into the magnetic box to create a magnetic gasket within the magnetized box for controlling the flow of the spilled oil. Additionally, in another embodiment, a plurality of pole pieces can be formed on each end of the plurality of solenoids. In still another embodiment of such a system, a power source can be connected to the origin of the tether wherein the tether provides power to the thruster and the tether provides power to the solenoids thereby creating an electromagnetic field. In another embodiment, the plurality of solenoids can be activated periodically to create a pumping effect on the magnetized spilled oil.

While the present invention has been particularly shown and described with reference to a preferred embodiment, it will be understood by those skilled in the art that various changes in form and detail may be made therein without departing from the spirit and scope of the invention. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An electromagnetic boom apparatus, said apparatus comprising:
   a plurality of solenoids and a plurality of buoys alternately linked on a tether;
   a power supply operably connected to said plurality of solenoids via said tether;
   a thruster connected to a distal end of said tether for sweeping said tether through an environment; and
   a collection apparatus formed at a origin of said tether wherein said solenoids produce a driving magnetic field that pumps spilled of to said collection apparatus.

2. The electromagnetic boom apparatus of claim 1 further comprising a plurality of pole pieces formed on each end of said plurality of solenoids.

3. The electromagnetic boom apparatus of claim 1 further comprising the power source connected to the origin of said tether wherein said tether provides power to said thruster and said tether provides power to said solenoids thereby creating an electromagnetic field.

4. The electromagnetic boom apparatus of claim 1 further comprising a plurality of iron filings wherein said spilled oil is magnetized by mixing said a plurality of iron filings with said spilled oil.

5. The electromagnetic boom apparatus of claim 4 further comprising:
   a magnetic box fitted over a source of said spilled oil; and
   a pipe fitted to said magnetic box wherein said magnetized spilled oil is pumped into said magnetic box thereby creating a magnetic gasket to control the flow of said spilled oil.

6. A system for collecting spilled oil, said system comprising:
   a plurality of solenoids and a plurality of buoys alternately linked on a tether;
   a power supply operably connected to said plurality of solenoids via said tether;
   a thruster connected to a distal end of said tether for sweeping said tether through an environment;
   a plurality of iron filings mixed with spilled oil thereby rendering said spilled oil magnetic; and
   a collection apparatus formed at an origin of said tether wherein at least one solenoid among said plurality of solenoids produced a driving magnetic field that pumps said magnetized spilled oil to said collection apparatus.

7. The system of claim 6 further comprising a plurality of pole pieces formed on each end of said plurality of solenoids.

8. The system of claim 6 further comprising a power source connected to said origin of said tether wherein said tether provides power to said thruster and said tether provides power to said solenoids thereby creating an electromagnetic field.

9. The system of claim 6 wherein said plurality of solenoids are activated periodically to create a pumping effect on said magnetized spilled oil.

10. The system of claim 6 wherein said environment comprises an aquatic environment.

* * * * *